(12) United States Patent
Maltauro

(10) Patent No.: US 10,093,129 B2
(45) Date of Patent: Oct. 9, 2018

(54) HUB FOR A BICYCLE WHEEL

(71) Applicant: Campagnolo S.r.l., Vicenza (IT)

(72) Inventor: Paolo Maltauro, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 135 days.

(21) Appl. No.: 15/367,550

(22) Filed: Dec. 2, 2016

(65) Prior Publication Data

US 2017/0157982 A1  Jun. 8, 2017

(30) Foreign Application Priority Data

Dec. 3, 2015 (IT) .............................. UB2015A6263

(51) Int. Cl.
| | | |
|---|---|---|
| *B60B 27/02* | (2006.01) | |
| *B60B 27/00* | (2006.01) | |
| *B60B 27/04* | (2006.01) | |

(52) U.S. Cl.
CPC ........ *B60B 27/023* (2013.01); *B60B 27/0015* (2013.01); *B60B 27/0052* (2013.01); *B60B 27/0078* (2013.01); *B60B 27/02* (2013.01); *B60B 27/04* (2013.01); *B60B 27/0005* (2013.01); *B60B 27/047* (2013.01); *B60B 2380/12* (2013.01); *B60B 2900/211* (2013.01); *B60B 2900/541* (2013.01)

(58) Field of Classification Search
CPC ... B60B 27/023; B60B 27/02; B60B 27/0015; B60B 27/0052; B60B 27/0078; B60B 27/04; B60B 2900/541; B60B 27/047; B60B 2380/12; B60B 2900/211; B60B 27/0005

USPC .............. 301/6.5, 6.6, 6.7, 6.8, 124.1, 105.1
See application file for complete search history.

(56) References Cited

U.S. PATENT DOCUMENTS

| | | |
|---|---|---|
| 2,036,172 A | 3/1936 | Gagnon |
| 4,678,360 A | 7/1987 | Miller |
| 6,591,461 B2 | 7/2003 | Salentine et al. |
| (Continued) | | |

FOREIGN PATENT DOCUMENTS

| | | |
|---|---|---|
| DE | 7927939 U1 | 1/1980 |
| DE | 202009008246 U1 | 10/2009 |

OTHER PUBLICATIONS

Italian Search Report and Written Opinion in Italian Application No. UB2015A006263, dated Jul. 25, 2016, with English translation.

*Primary Examiner* — S. Joseph Morano
*Assistant Examiner* — Jean W Charleston
(74) *Attorney, Agent, or Firm* — Volpe and Koenig, P.C.

(57) ABSTRACT

The invention, in a first variant thereof, relates to a hub for a bicycle wheel with a disc brake. The hub comprises a pin extending along a longitudinal axis (X), a body rotatably mounted on the pin and comprising a coupling portion with a brake disc, a bearing radially interposed between the pin and the body and in axial abutment with the body, a cap associated with a free end portion of the pin and configured to be associated with the frame of the bicycle and a calibrated washer in axial abutment with the pin and one between the cap and the bearing or axially interposed between the bearing and the body.

By selecting a calibrated washer of desired thickness, it is possible to precisely position the brake disc with respect to the frame, and thus with respect to the pads associated therewith.

19 Claims, 16 Drawing Sheets

(56) References Cited

U.S. PATENT DOCUMENTS

| | | | |
|---|---|---|---|
| 8,251,460 B2 * | 8/2012 | Veux | B60B 27/023 |
| | | | 301/110.5 |
| 8,365,362 B2 | 2/2013 | Chou | |
| 2002/0149258 A1 * | 10/2002 | Lew | B60B 1/041 |
| | | | 301/110.5 |
| 2012/0204658 A1 * | 8/2012 | Mercat | B62M 6/50 |
| | | | 73/862.338 |
| 2012/0273308 A1 | 11/2012 | Uchida et al. | |
| 2014/0034174 A1 | 2/2014 | Kariyama et al. | |
| 2014/0034428 A1 | 2/2014 | Kariyama et al. | |
| 2014/0034429 A1 | 2/2014 | Kariyama et al. | |
| 2014/0038757 A1 | 2/2014 | Kariyama et al. | |
| 2014/0071971 A1 | 3/2014 | Kojima | |
| 2014/0318307 A1 | 10/2014 | Kariyama et al. | |
| 2015/0210347 A1 | 7/2015 | Chen et al. | |

\* cited by examiner

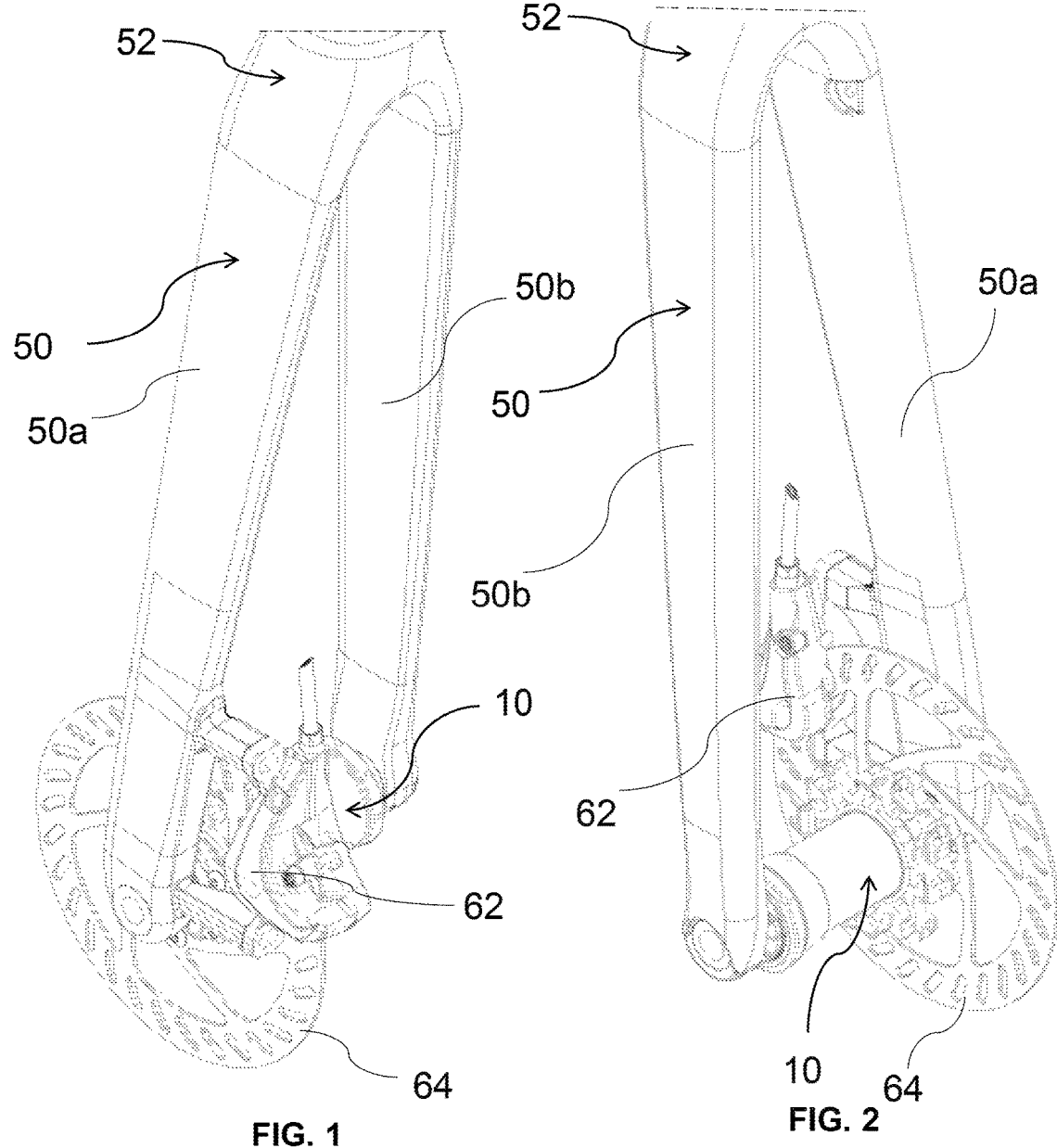

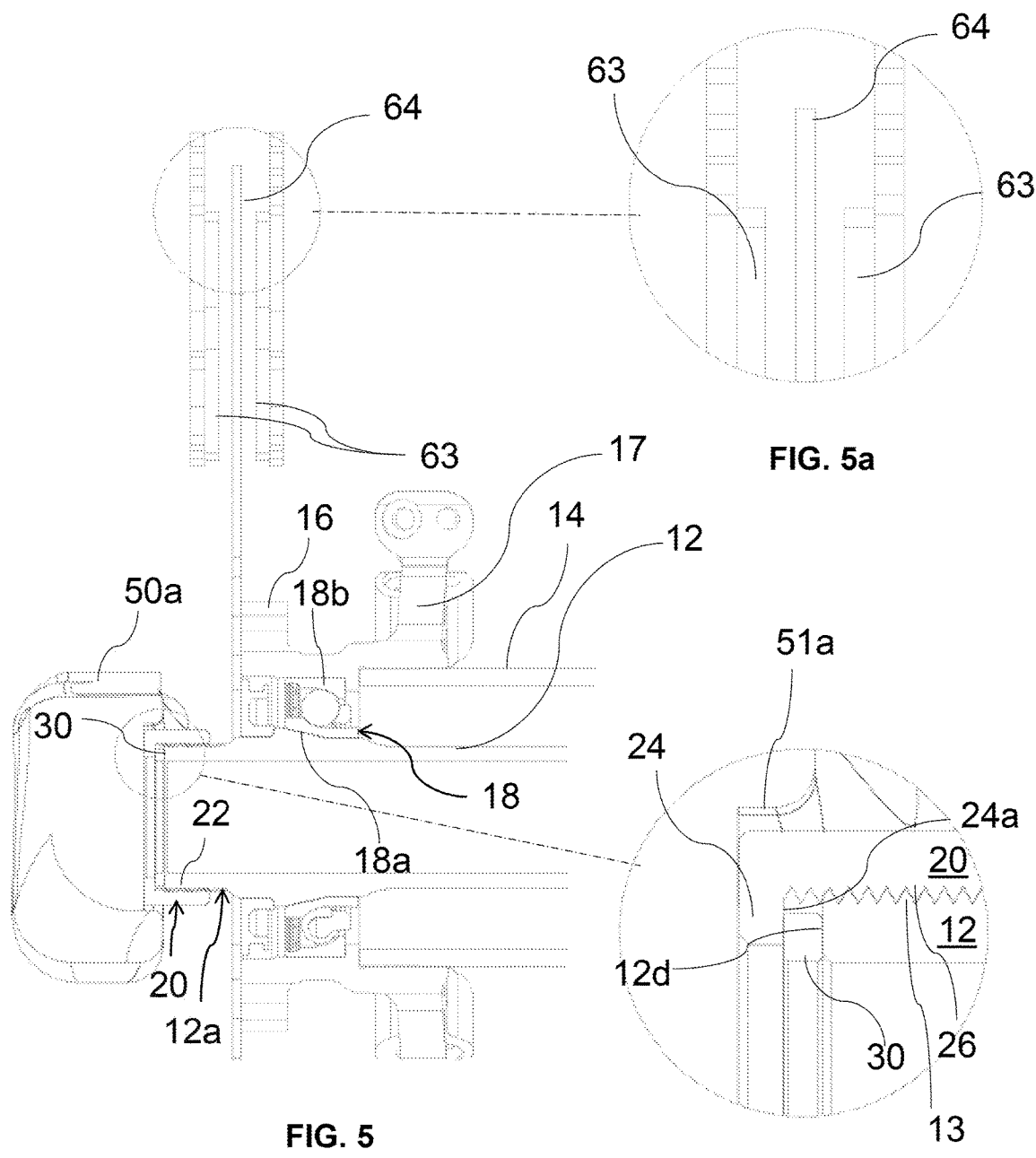

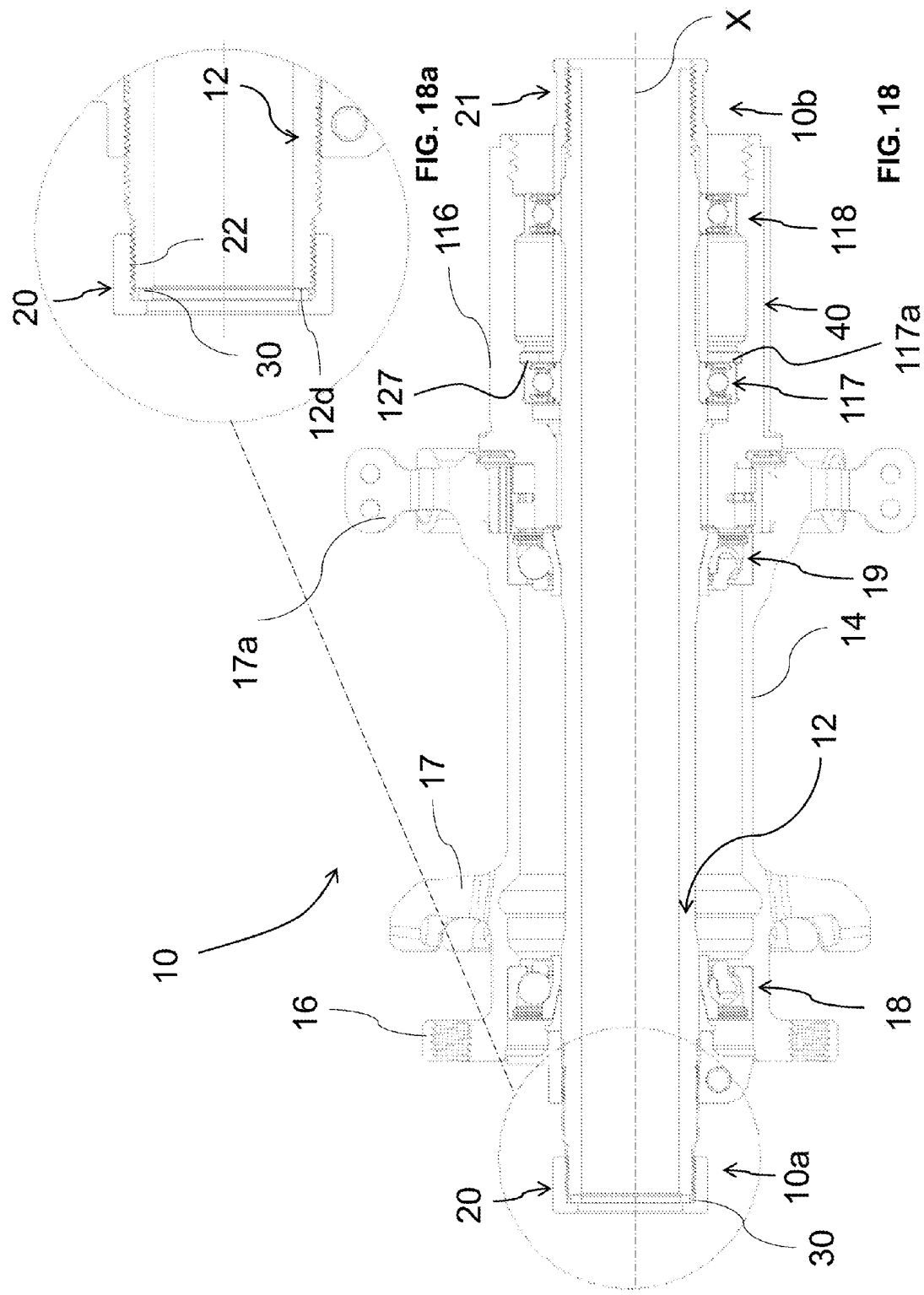

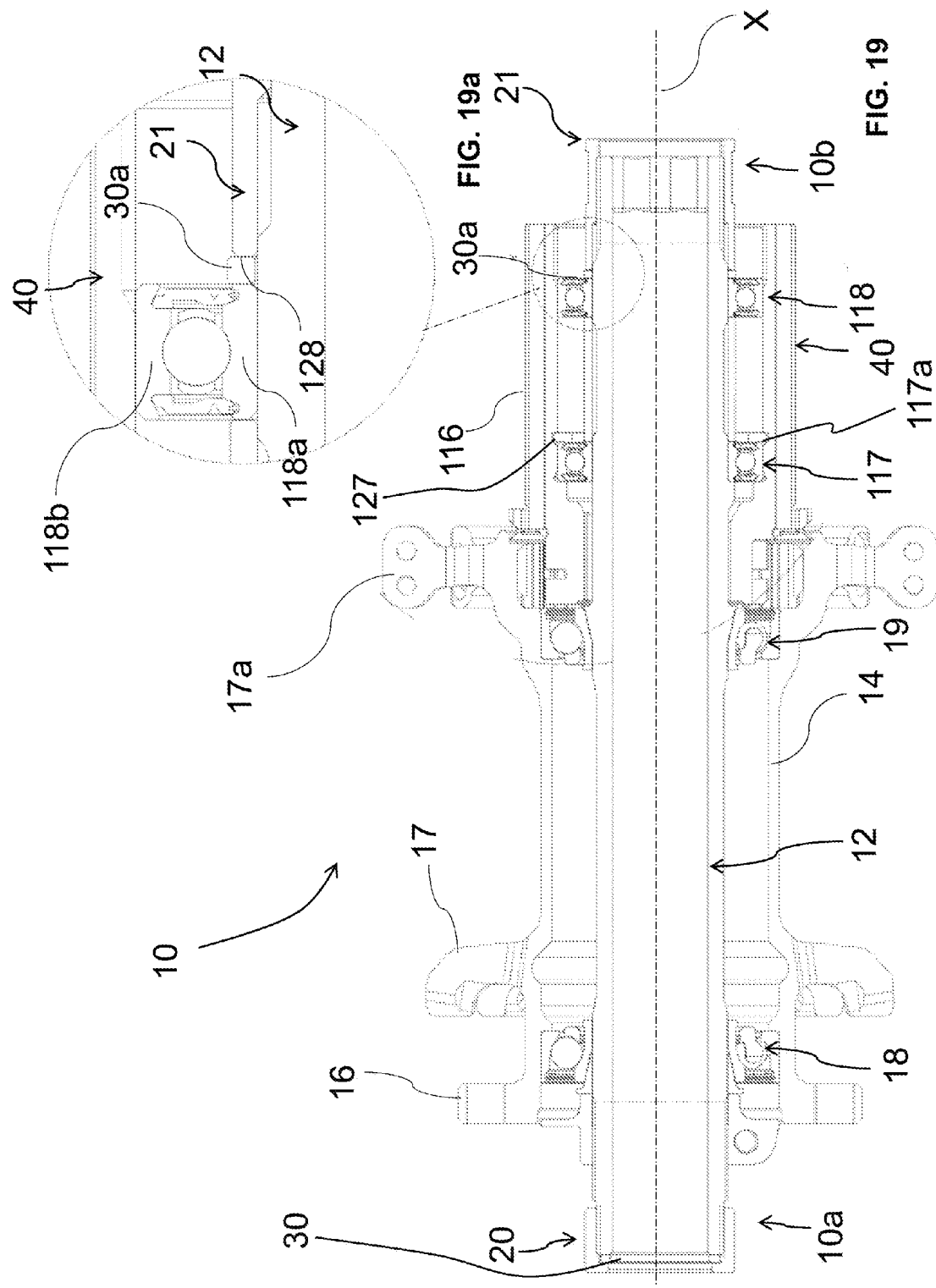

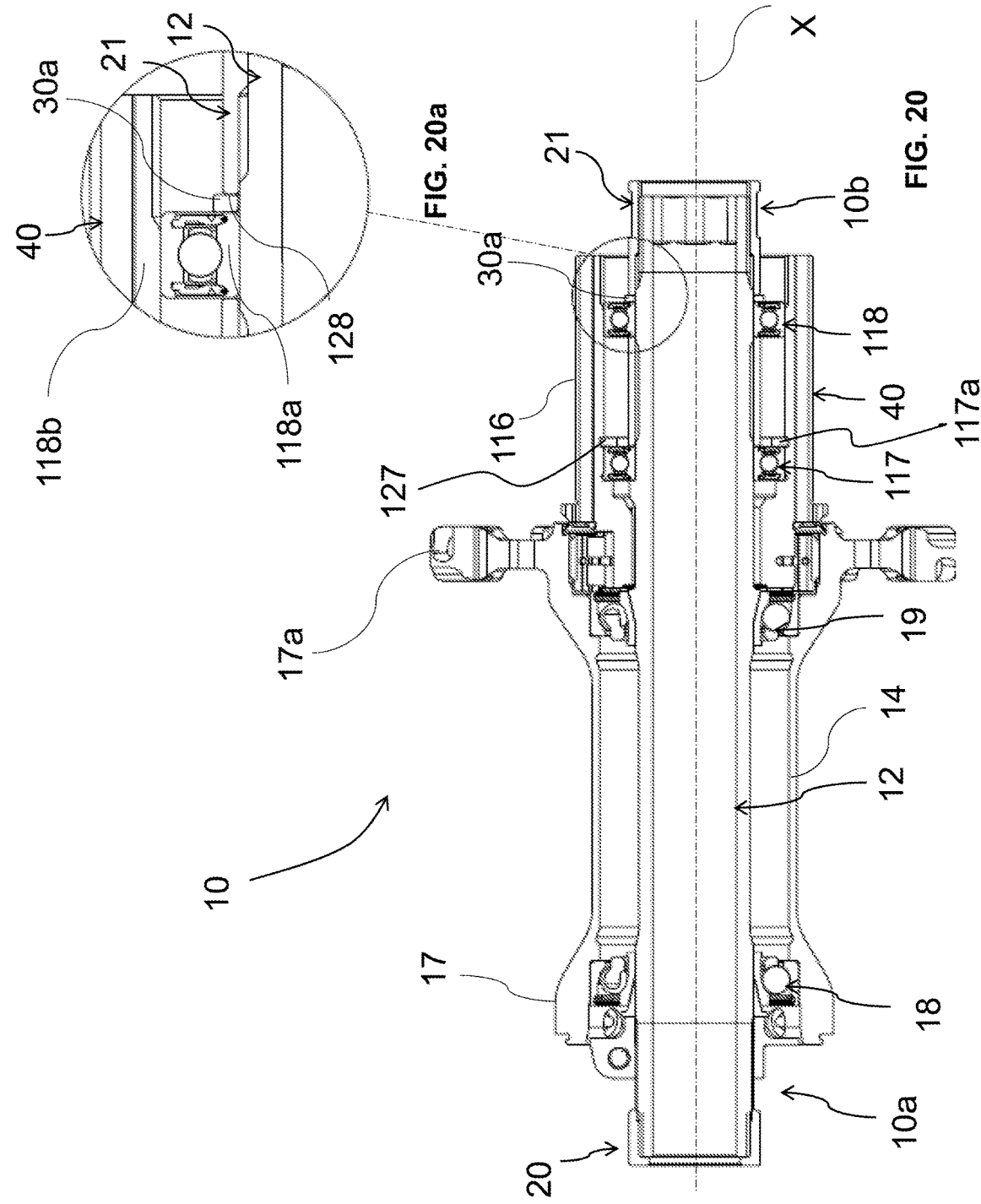

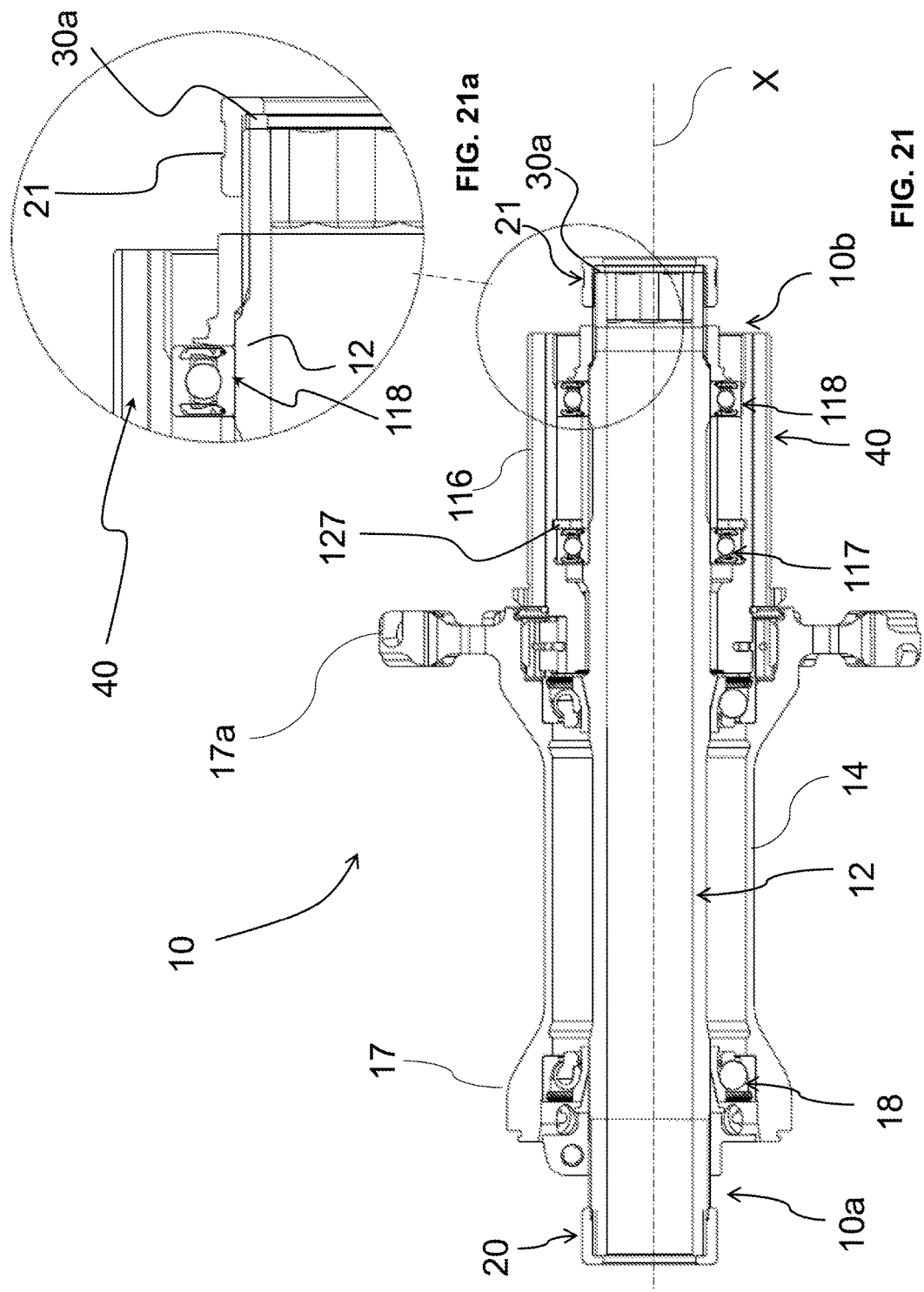

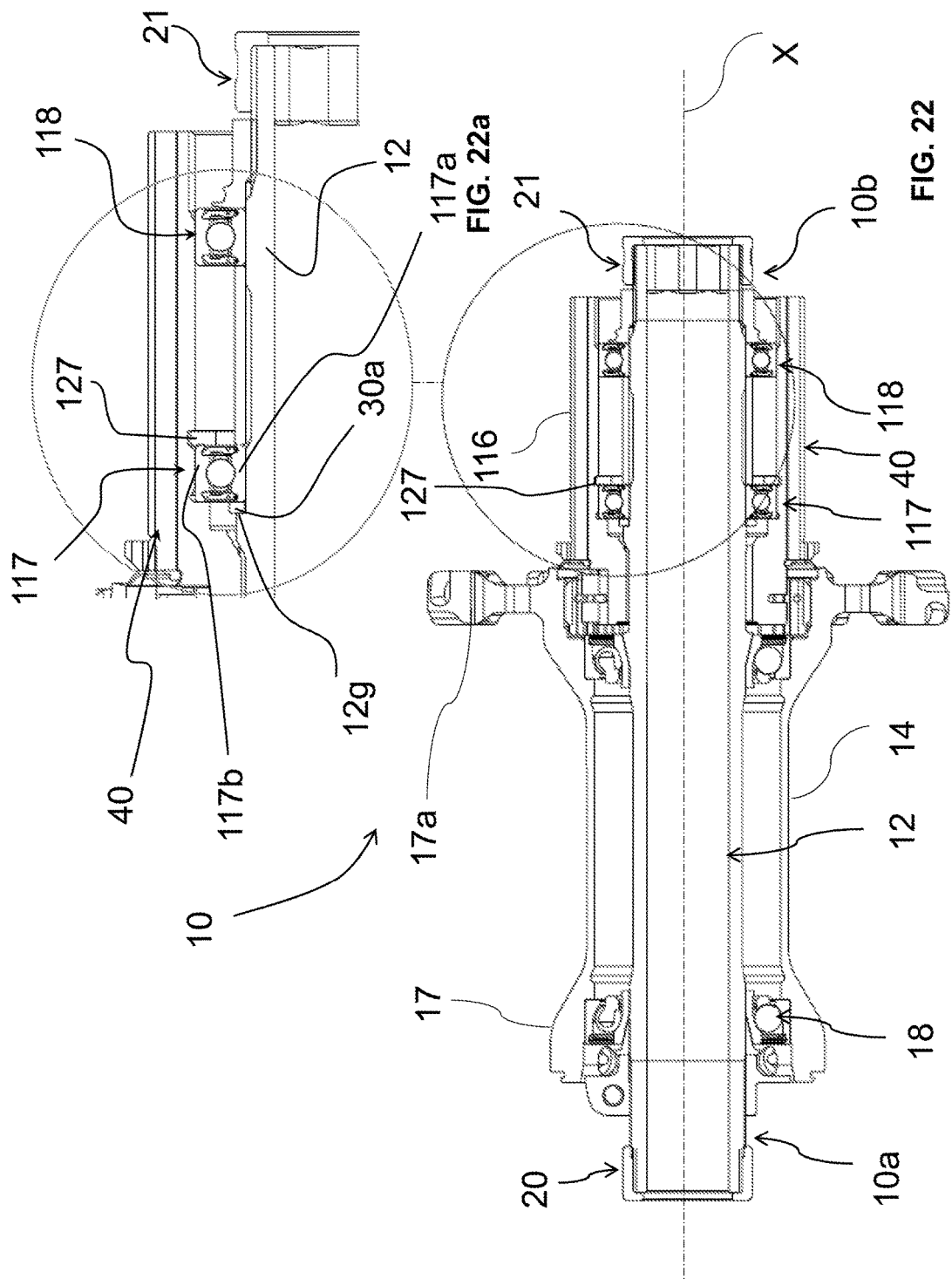

HUB FOR A BICYCLE WHEEL

CROSS REFERENCE TO RELATED APPLICATION(S)

This application claims the benefit of Italian Application No. UB2015A006263, filed on Dec. 3, 2015 and incorporated herein by reference as if fully set forth.

FIELD OF INVENTION

The present invention relates to a hub for a bicycle wheel.

In particular, in a first aspect thereof, the invention relates to a hub for a bicycle wheel, wherein such a wheel can be a front wheel or a rear wheel and comprises a body configured to support a brake disc.

In another aspect thereof, the invention relates to a hub for a rear bicycle wheel, such a hub comprising a free-wheel body configured to support a sprocket assembly.

BACKGROUND

As known, it is now common in bicycles to use disc brakes. Such brakes are indeed often preferred to conventional brakes of other kinds since they ensure a high braking force and are less subject to problems caused by mud or water.

Typically, a disc brake comprises a caliper fixed on the frame of the bicycle and a brake disc mounted on the hub of the wheel. Inside the caliper there are two or four opposite pads. The brake disc rotates inside the space defined between the opposite pads. By actuating the brake lever, the pads are brought towards the brake disc, generating friction on the brake disc and, consequently, braking the wheel.

The mounting operations of the wheel on the frame of the bicycle (both the first mounting operations and the wheel change/replacement operations) thus provide for the positioning of the brake disc associated with the hub of the wheel inside the space defined between the opposite pads of the caliper and the locking of the ends of the hub on the frame of the bicycle.

The Applicant has observed that in the mounting operations of the wheel it is desirable to obtain the precise centering of the brake disc between the pads. In this way, indeed, following the actuation of the brake, both pads work and in an identical manner, maximizing the braking action and minimizing the differences in wear between the opposite pads. Moreover, the risk of the brake disc touching one of the pads when the brake is not actuated is avoided. This would result in an undesired reduction in speed of the bicycle, for the same effort of the cyclist.

What has been outlined above is of particular importance in the racing bicycles.

The Applicant has noted that, particularly in the case of replacement of the wheel (for example due to a puncture), there is the real risk of not obtaining the desired centering of the brake disc between the pads.

According to the Applicant, this is due to the dimensional and mounting tolerances of the various components of the hub. Therefore, the position of the brake disc along the longitudinal axis of the hub may not be identical in different wheels, so that the mounting of different wheels on the same frame can lead to a different positioning of the brake disc between the pads.

The Applicant has observed that the problems linked to the incorrect positioning of the brake disc between the pads are accentuated by the fact that the pads are very close to one another. Therefore, even a small difference in axial positioning of the brake disc on the hub of the various wheels results in a large difference in axial positioning of the brake disc with respect to the pads.

The Applicant has also observed that the aforementioned problems are even more accentuated in the case of mounting/changing a wheel during a race or, in general, in all those cases in which it is necessary or desired to carry out the wheel mounting/change in the shortest possible time. In these cases, indeed, it is not possible to dedicate time to possible adjustments or modifications of positioning of the various components of the hub and/or of the braking system.

The Applicant has found a solution that makes it possible to ensure the precise centering of the brake disc associated with a bicycle wheel between the pads of a caliper associated with the frame of the bicycle, even in the cases of wheel change.

The Applicant has observed that a requirement similar to the one discussed above with reference to the brake disc occurs in the rear wheel of the bicycle with reference to the sprocket assembly mounted on the free-wheel body. Indeed, it is desirable to obtain the precise positioning of the sprocket assembly with respect to the frame of the bicycle to allow the correct engagement of the chain with the single sprockets of the sprocket assembly.

The Applicant has realized that the precise positioning of the sprocket assembly is as well achievable using a calibrated washer in the hub of the rear wheel of the bicycle.

The Applicant has observed that both the hub for a front or rear wheel with disc brake and the hub with free-wheel body for a rear wheel comprise a pin extending along a longitudinal axis, a cap associated with a free end portion of the pin and configured to be associated with the frame of the bicycle and a body rotatably mounted on the pin through at least one bearing and configured to support the disc brake or the sprocket assembly.

The Applicant has realized that the precise positioning of the brake disc and of the sprocket assembly with respect to the frame can be obtained by adjusting the axial position of the body of the hub that supports the brake disc and of the free-wheel body, respectively, and that such adjustment can in both cases be obtained by using a suitable calibrated washer in the hub of the bicycle wheel.

SUMMARY

The present invention therefore relates to a hub for a bicycle wheel, comprising:

a pin extending along a longitudinal axis;

a first body rotatably mounted on the pin and configured to take a predetermined axial position with respect to the frame of a bicycle;

a first bearing radially interposed between the pin and the first body;

a first cap associated with a first free end portion of the pin and configured to be associated with a frame of the bicycle;

wherein the first bearing is in axial abutment with the first body, and the hub comprises a first calibrated washer in axial abutment with the pin and one between the first cap and the first bearing or axially interposed between the first bearing and the first body, or in that the first calibrated washer is axially interposed between the first bearing and the first cap.

More specifically, the present invention, in a first aspect thereof, relates to a hub for a bicycle wheel with disc brake, comprising:

a pin extending along a longitudinal axis;

a first body rotatably mounted on the pin and comprising a coupling portion with a brake disc;

a first bearing radially interposed between the pin and the first body and in axial abutment with the first body;

a first cap associated with a first free end portion of the pin and configured to be associated with a frame of the bicycle; and, a first calibrated washer in axial abutment with the pin and the first cap.

In a second aspect thereof, the present invention relates to a hub for a bicycle wheel with disc brake, comprising:

a pin extending along a longitudinal axis;

a first body rotatably mounted on the pin and comprising a coupling portion with a brake disc;

a first bearing radially interposed between the pin and the first body and in axial abutment with the first body;

a first cap associated with a first free end portion of the pin and configured to be associated with a frame of the bicycle; and, a first calibrated washer in axial abutment with the pin and the first bearing.

In a third aspect thereof, the present invention relates to a hub for a bicycle wheel with disc brake, comprising:

a pin extending along a longitudinal axis;

a first body rotatably mounted on the pin and comprising a coupling portion with a brake disc;

a first bearing radially interposed between the pin and the first body and in axial abutment with the first body;

a first cap associated with a first free end portion of the pin and configured to be associated with a frame of the bicycle; and, a first calibrated washer axially interposed between the first bearing and the first body.

In a fourth aspect thereof, the present invention relates to a hub for a bicycle wheel, comprising:

a pin extending along a longitudinal axis;

a first body rotatably mounted on the pin and comprising a coupling portion with a plurality of sprockets a first bearing radially interposed between the pin and the first body;

a first cap associated with a first free end portion of the pin and configured to be associated with a frame of the bicycle;

wherein the first calibrated washer is axially interposed between the first bearing and the first cap.

In the present description and in the subsequent claims, the terms "axial, "axially", "longitudinal", "longitudinally" and similar refer to a direction substantially coinciding with or substantially parallel to the longitudinal axis of the pin of the hub, whereas the terms "radial", "radially" and similar refer to a direction that lies in a plane substantially perpendicular to the longitudinal axis of the pin of the hub.

In the present description and in the subsequent claims, the expression "calibrated washer" is meant to indicate a washer of predetermined longitudinal thickness, where the longitudinal thickness of the washer corresponds to the axial length of the washer (corresponding, when the hub is assembled, to the size of the washer along the longitudinal or axial direction of the pin of the hub).

Advantageously, thanks to the provision of the calibrated washer and the possibility of selecting the calibrated washer of desired longitudinal thickness among a plurality of calibrated washers of different longitudinal thicknesses, it is possible to ensure the precise centering of the brake disc associated with any front or rear bicycle wheel between the pads of a caliper associated with the frame of the bicycle or, in the case of hub for rear wheel, the precise positioning of the free-wheel body (and therefore of the sprocket assembly associated therewith) with respect to the frame of the bicycle.

Herein below, some preferred embodiments of a hub in accordance with any one of the first three aspects of the invention are described.

In a first preferred embodiment of the hub, the first calibrated washer is housed in a longitudinal cavity of the first cap and is in axial abutment with the first cap and with an end face of the pin.

More preferably, the first calibrated washer is in axial abutment with an axially inner face of an end wall of the first cap.

In this way, the calibrated washer can be advantageously arranged in the longitudinal cavity of the cap before the hub is mounted, consequently simplifying the mounting operations.

Preferably, the longitudinal cavity is a through cavity.

In a second preferred embodiment of the hub, the first calibrated washer is in axial abutment with an end face of the first cap and with a first shoulder formed on the pin.

More preferably, the first calibrated washer is fitted without interference on the first free end portion of the pin.

Also in this case, the hub is extremely simple to mount, since the calibrated washer can be advantageously fitted on the free end portion of the pin before mounting the cap.

In a third preferred embodiment of the hub, the first calibrated washer is in axial abutment with an inner ring of the first bearing and with a second shoulder formed on the pin, the second shoulder being provided between the first free end portion of the pin and the first bearing.

In a fourth preferred embodiment of the hub, the first calibrated washer is in axial abutment with an outer ring of the first bearing and with a third shoulder formed on the first body, the third shoulder being provided at an opposite part to the first free end portion of the pin with reference to the first bearing.

Herein below some preferred characteristics of a hub in accordance with the fourth aspect of the present invention are described.

In a first preferred embodiment of the hub, the first calibrated washer is in axial abutment with one of opposite end faces of the first cap and with an inner ring of the first bearing.

More preferably, the first calibrated washer is fitted without interference on the first free end portion of the pin.

Also in this case, the hub is extremely simple to mount, since the calibrated washer can be advantageously fitted on the free end portion of the pin before mounting the cap.

In a second preferred embodiment of the hub, the first calibrated washer is housed in a longitudinal cavity of the first cap and is in axial abutment with the first cap and with an end face of the pin.

More preferably, the first calibrated washer is in axial abutment with an axially inner face of an end wall of the first cap.

In this way, the calibrated washer can be advantageously arranged in the longitudinal cavity of the cap before the hub is mounted, consequently simplifying the mounting operations.

In a third preferred embodiment of the hub, the first calibrated washer is in axial abutment with an inner ring of the first bearing and with a fourth shoulder formed on the pin.

In a fourth preferred embodiment of the hub, the first calibrated washer is in axial abutment with an outer ring of the first bearing and with a fifth shoulder formed on the first body.

In the case of rear wheel with disc brake, preferably, the hub comprises:

a second body rotatably mounted on the pin and comprising a coupling portion with the brake disc;

a second bearing radially interposed between the pin and the second body; and, a second cap associated with a second free end portion of the pin and configured to be associated with the frame of the bicycle.

More preferably, the hub comprises a second calibrated washer in axial abutment with the pin and one between the second cap and the second bearing or axially interposed between the second bearing and the second body.

In all of the embodiments of all of the aspects of the invention described above, preferably, the cap is screwed to the free end portion of the pin.

More preferably, the free end portion of the pin comprises an external threading and the cap comprises an internal threading matching the external threading.

Preferably, the pin comprises, at the free end portion, a polyhedron-shaped radially inner surface.

Advantageously, this provision allows the use of a suitable tool, having a polyhedron-shaped radially outer surface matching the radially inner surface of the pin, in order to hold the pin in position while the cap is screwed to the pin.

Preferably, the radially inner surface comprises a plurality of substantially flat faces, joined two-by-two at a respective rounded edge.

The provision of rounded edges makes it possible to not excessively reduce the radial thickness of the pin, which would be to the detriment of the mechanical resistance thereof to the stresses.

BRIEF DESCRIPTION OF THE DRAWING(S)

Further features and advantages of the invention will become clearer from the description of preferred embodiments thereof, made with reference to the attached drawings, where:

FIGS. 1 and 2 are perspective views, taken from opposite viewpoints, of a disc brake mounted on a fork of the bicycle, such a disc brake comprising a brake disc mounted on a hub for a front bicycle wheel, according to the present invention;

FIG. 5 is a longitudinal section of a portion of the disc brake of FIGS. 1 and 2 (FIGS. 5a and 5b are enlargements of two different portions of such a disc brake, such portions being circled in FIG. 5);

Figure 6A:
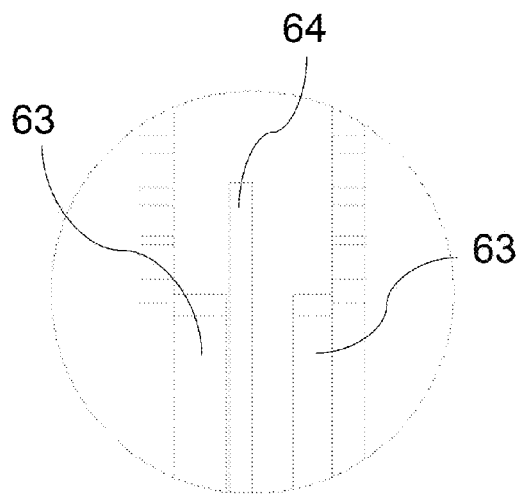
Figure 7A:
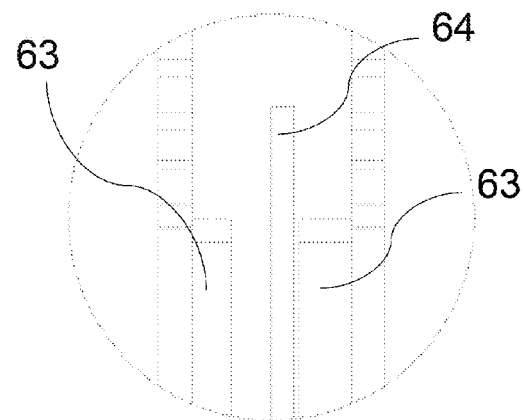
Figure 6B:
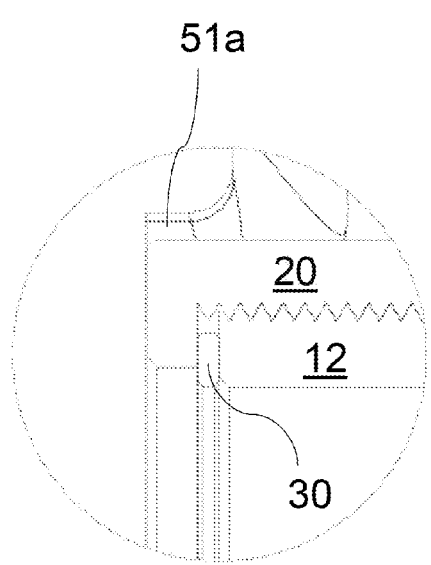
Figure 7B:
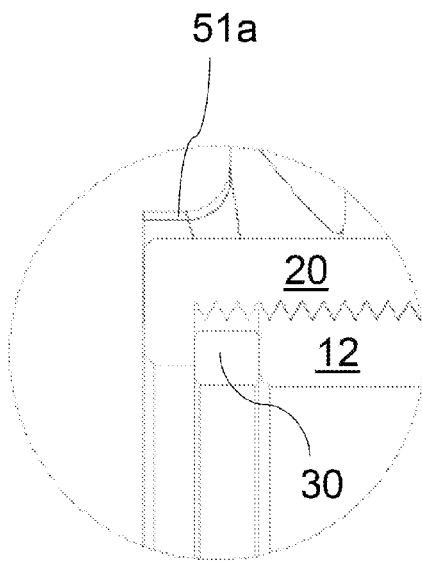
Figure 8:
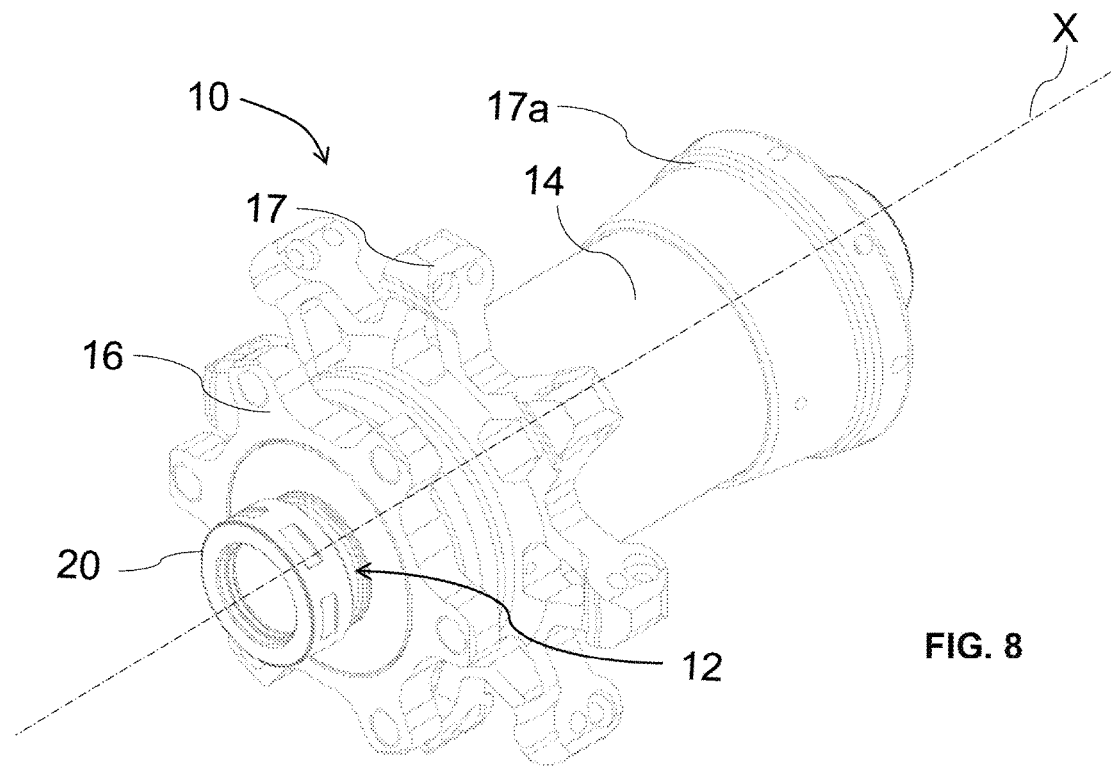
Figure 9:
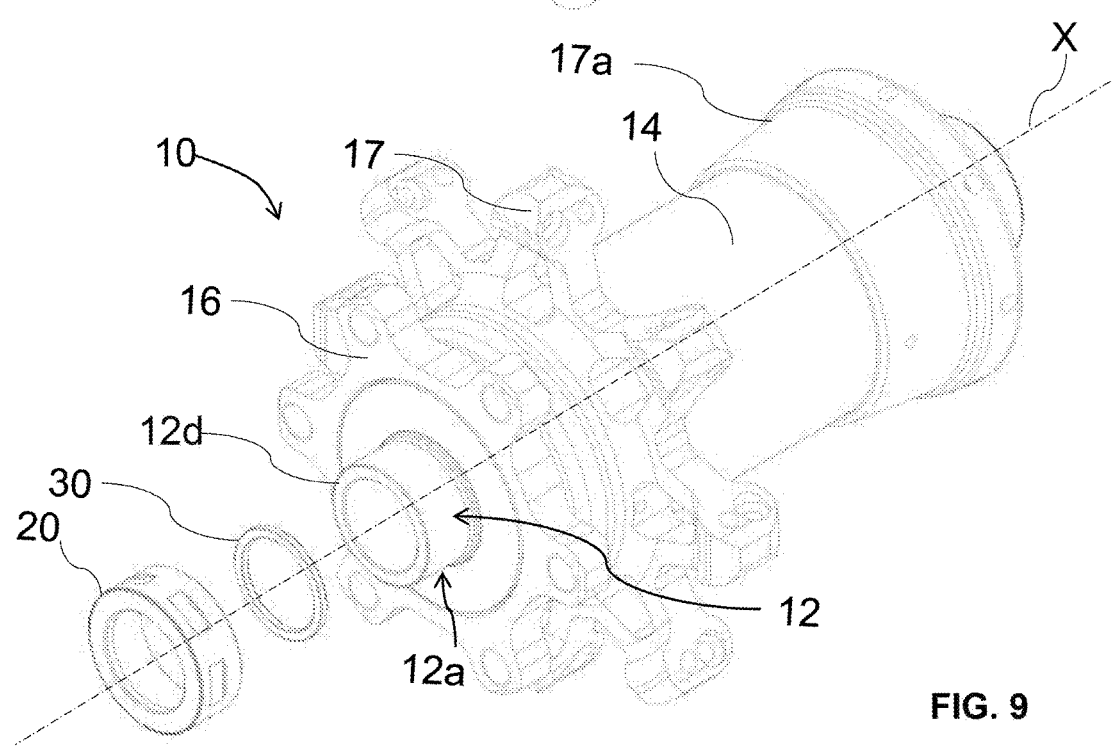
Figure 10:
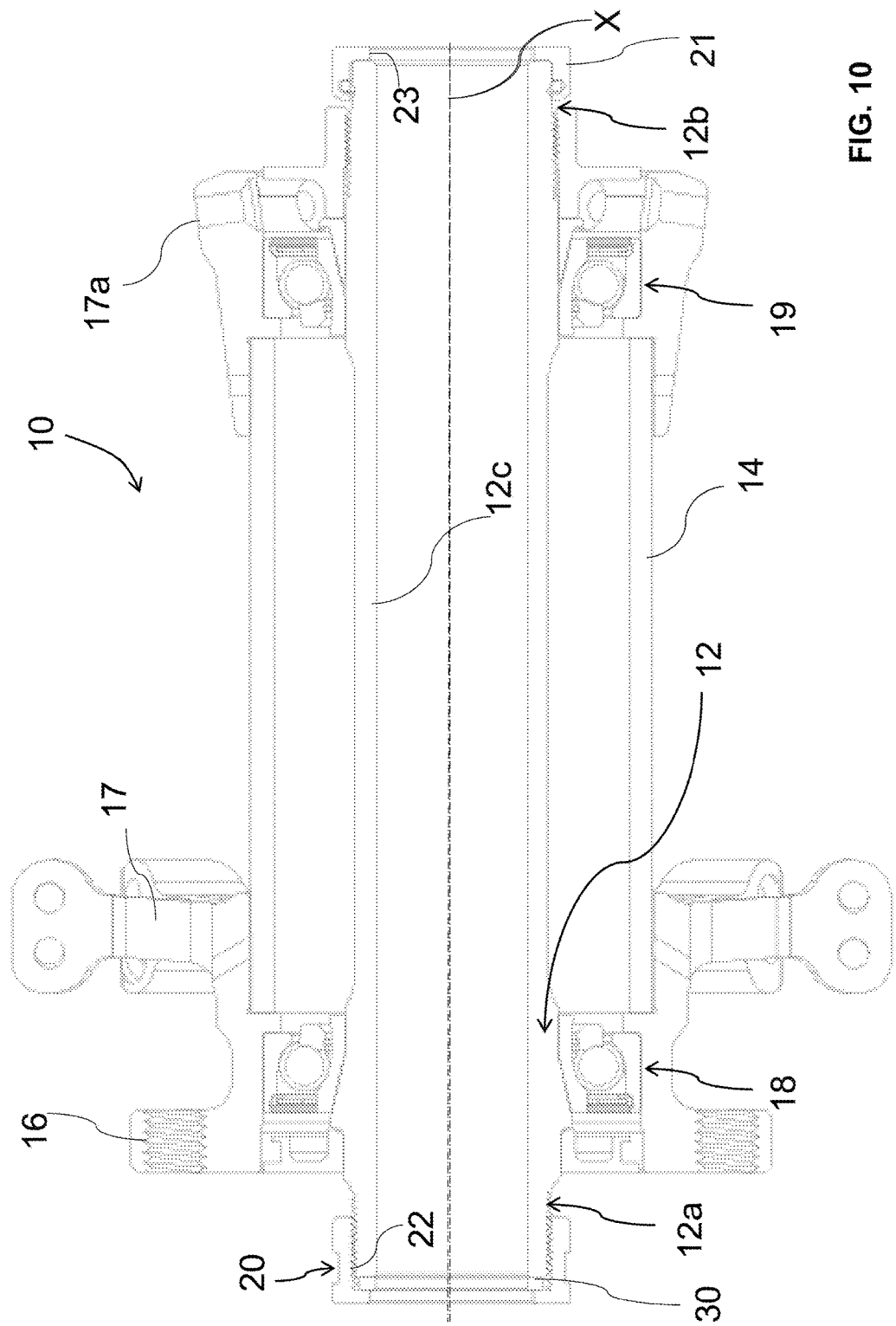
Figure 11:
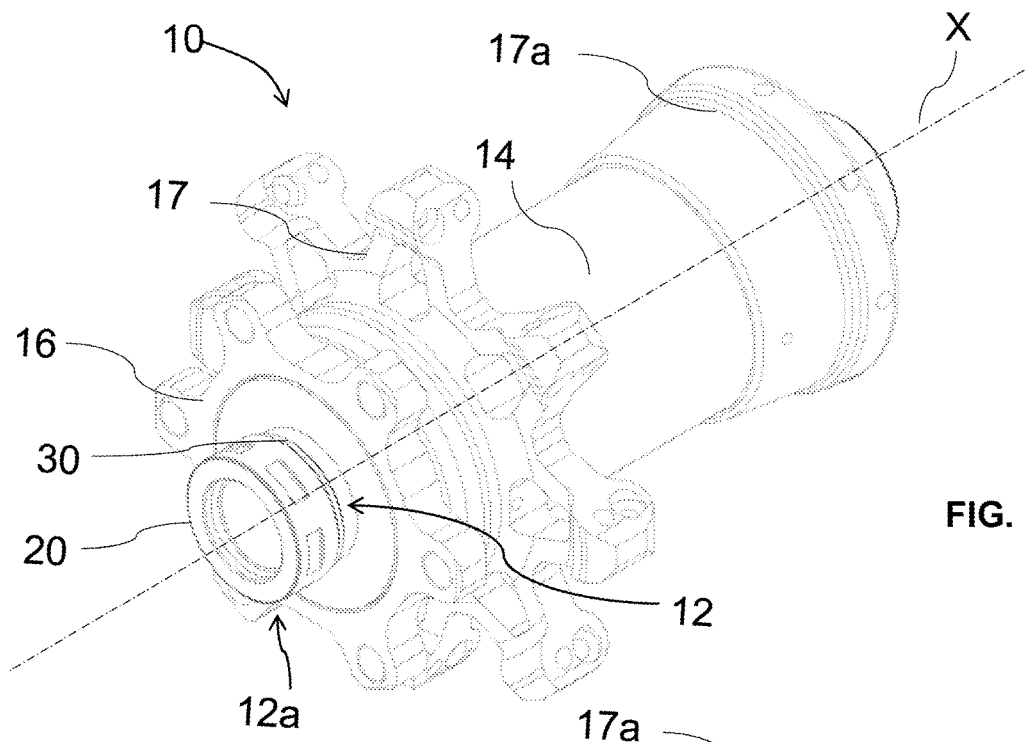
Figure 12:
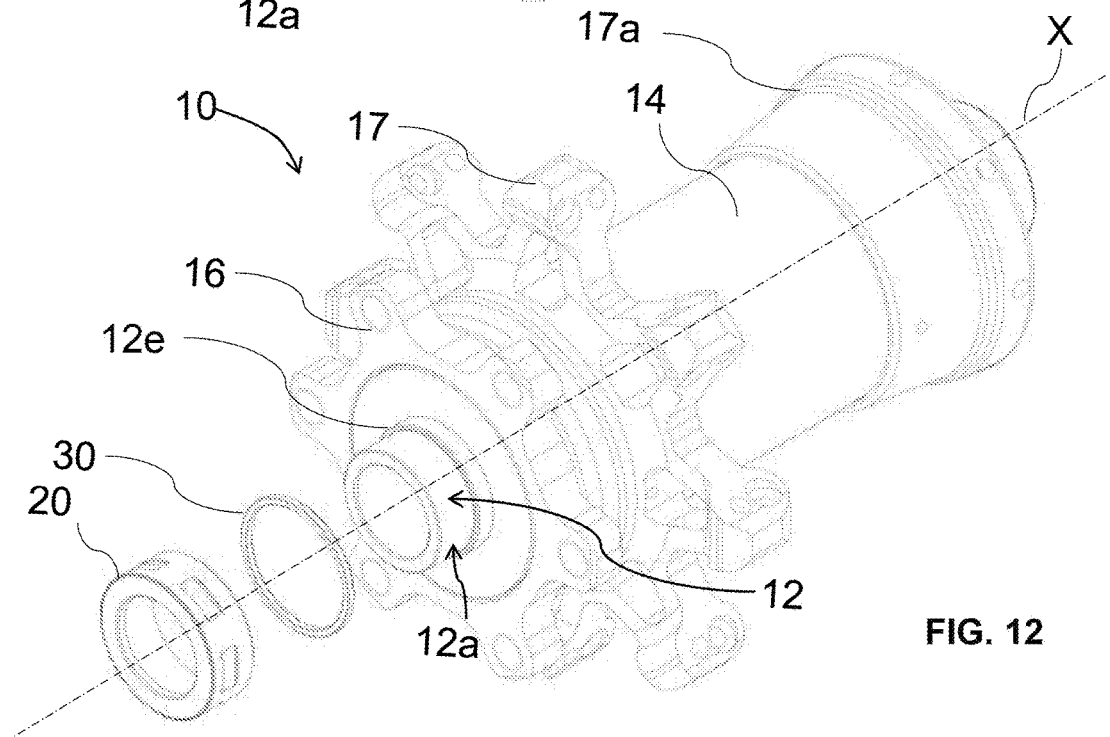
Figure 13:
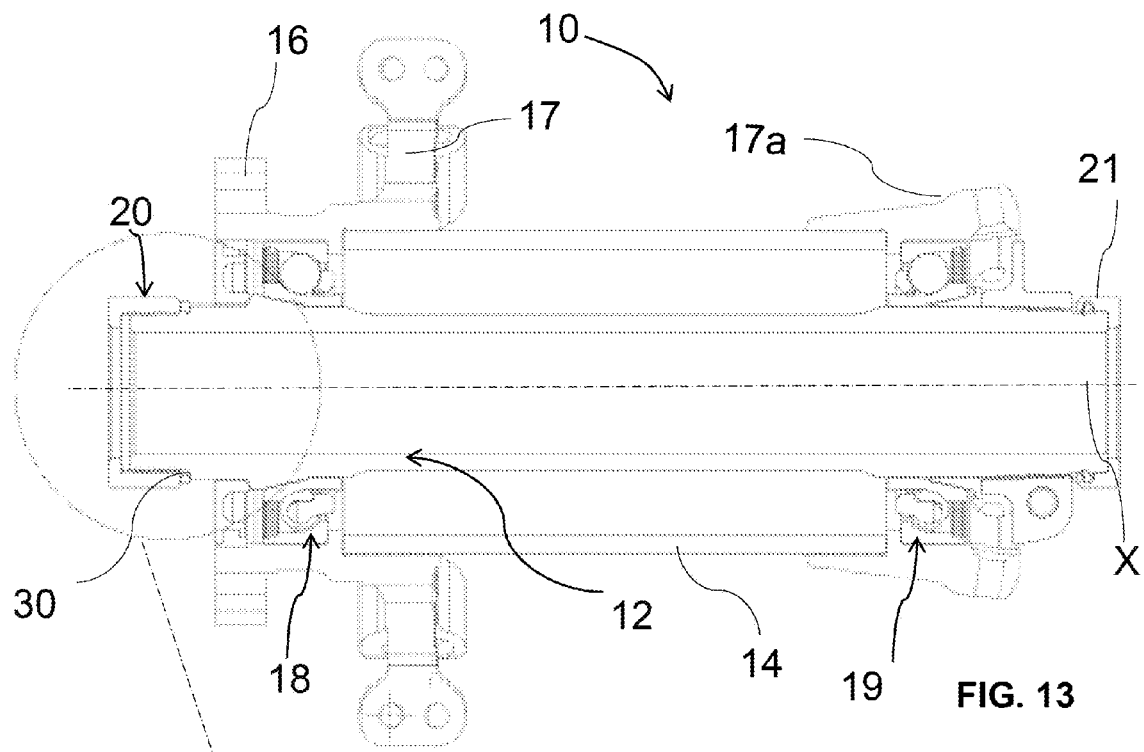
Figure 13A:
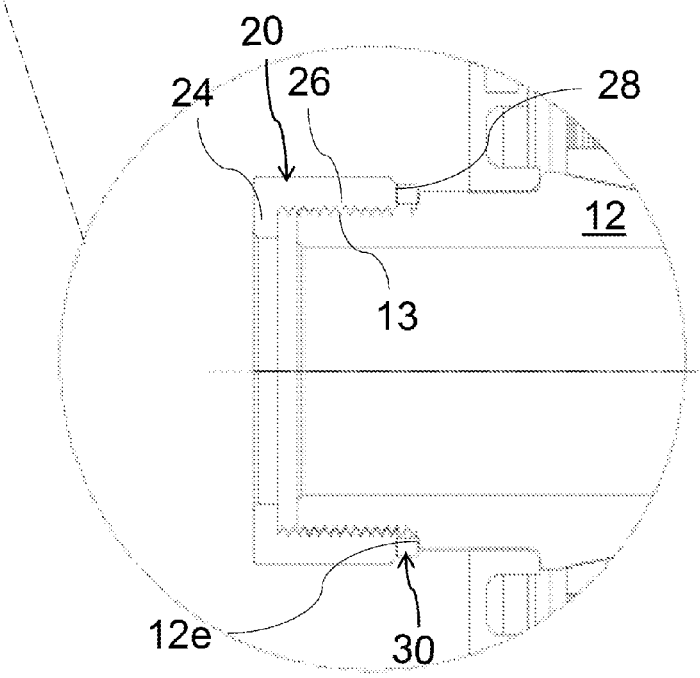
Figure 14:
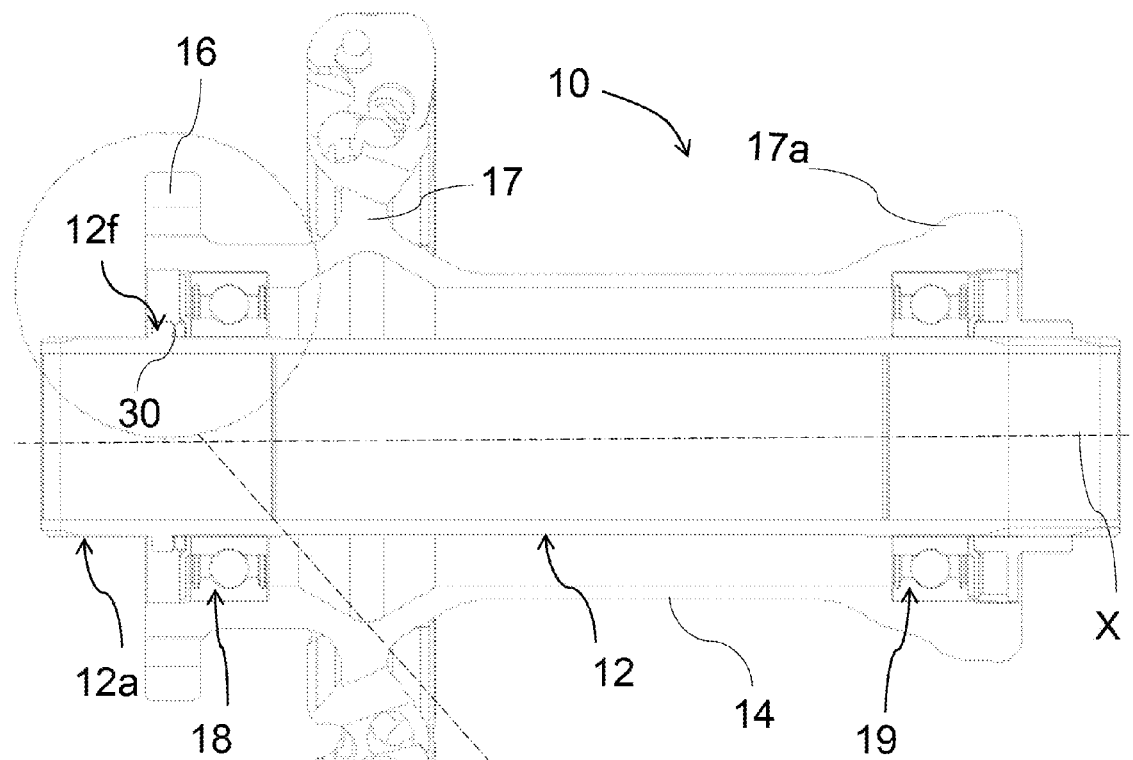
Figure 14A:
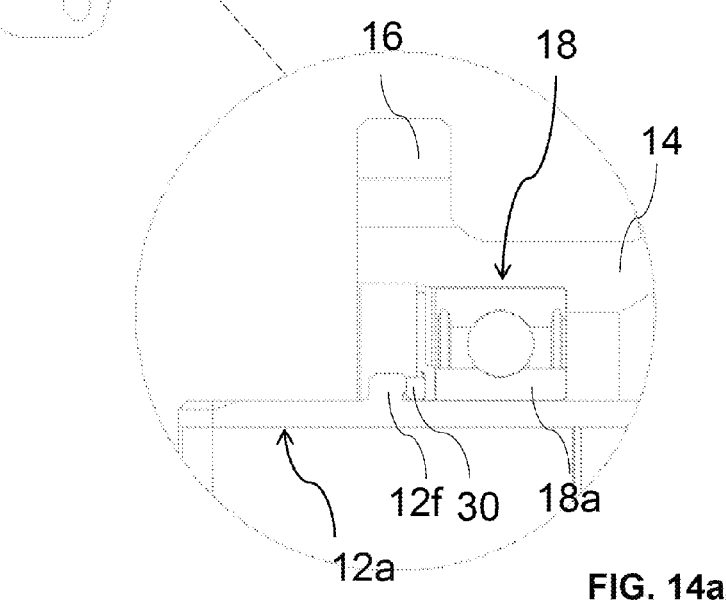
Figure 15:
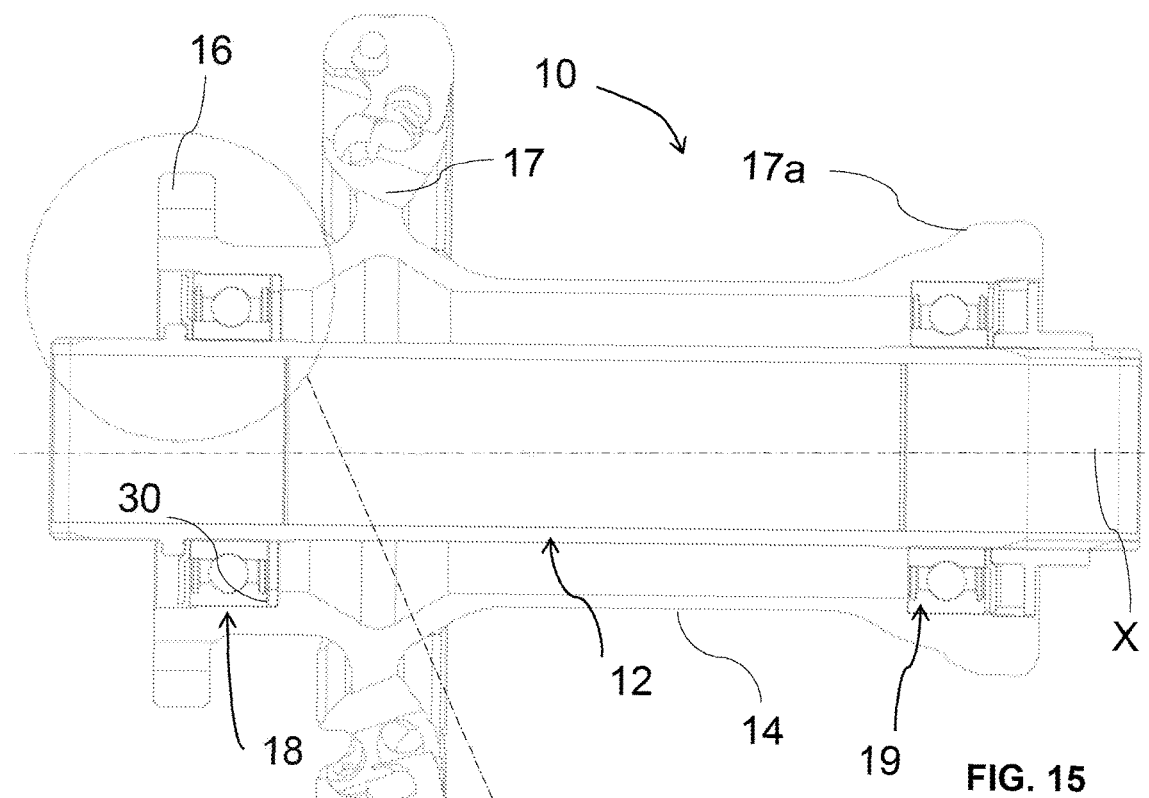
Figure 15A:
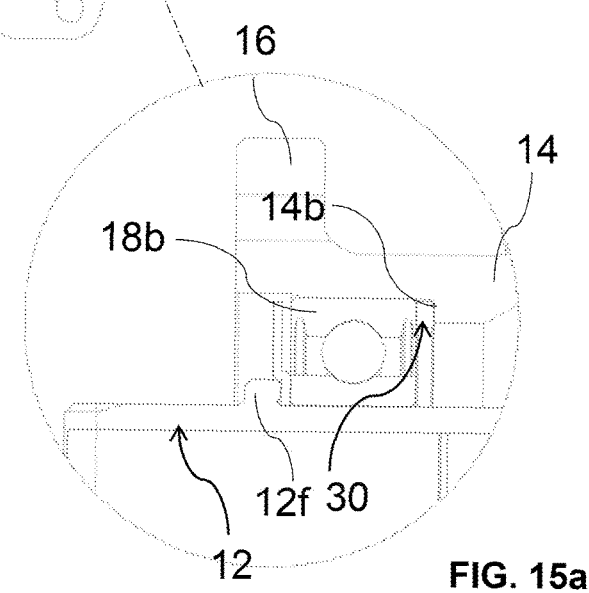
Figure 16:
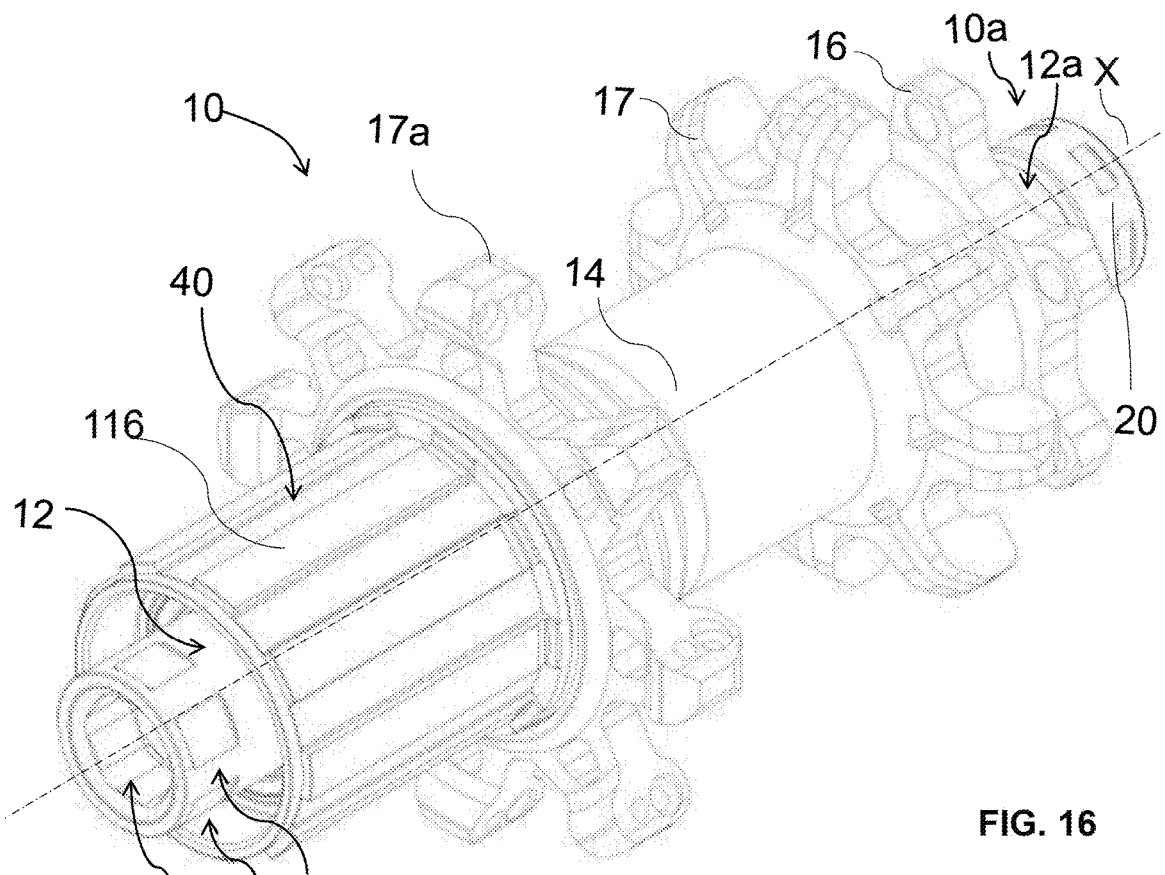
Figure 17:
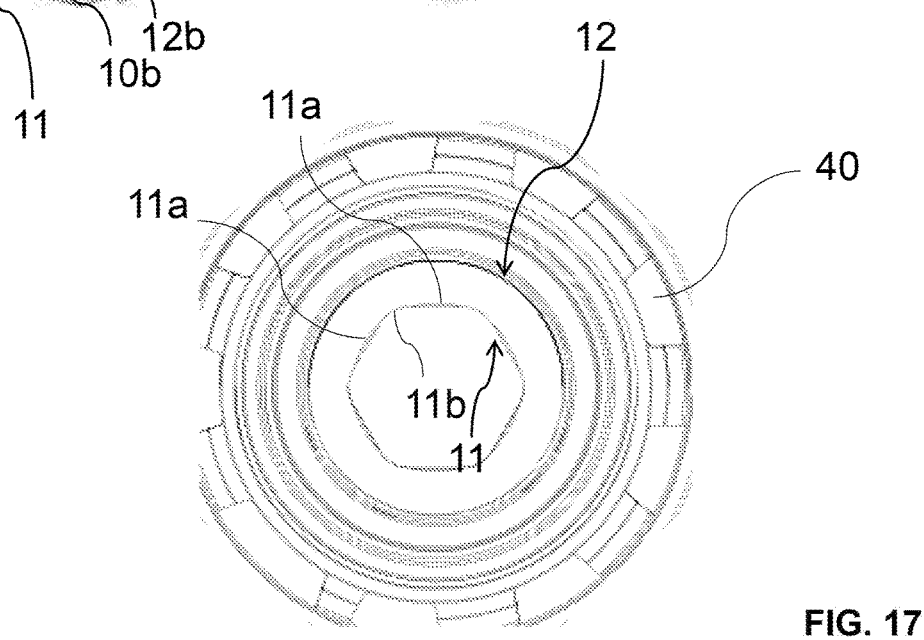

FIGS. 6a and 6b are views corresponding to FIGS. 5a and 5b, when a calibrated washer of lower thickness than that used in FIGS. 5a and 5b is used;

FIGS. 7a and 7b are views corresponding to FIGS. 5a and 5b, when a calibrated washer of greater thickness than that used in FIGS. 5a and 5b is used;

FIG. 8 is a perspective view of the hub of FIGS. 1 and 2;

FIG. 9 is an exploded perspective view of the hub of FIG. 8;

FIG. 10 is a longitudinal section of the hub of FIG. 8;

FIG. 11 is a perspective view of a second embodiment of a hub according to the present invention;

FIG. 12 is an exploded perspective view of the hub of FIG. 11;

FIG. 13 is a longitudinal section of the hub of FIG. 11;

FIG. 13a is an enlarged view of a detail circled in FIG. 13;

FIG. 14 is a longitudinal section of a third embodiment of a hub according to the present invention;

FIG. 14a is an enlarged view of a detail circled in FIG. 14;

FIG. 15 is a longitudinal section of a fourth embodiment of a hub according to the present invention;

FIG. 15a is an enlarged view of a detail circled in FIG. 15;

FIG. 16 is a perspective view of a hub for a rear bicycle wheel, according to the present invention;

FIG. 17 is a side view of the hub of FIG. 16;

FIG. 18 is a longitudinal section of the hub of FIG. 16;

FIG. 18a is an enlarged view of a detail circled in FIG. 18;

FIG. 19 is a longitudinal section of a further embodiment of a hub for a rear bicycle wheel, according to the present invention;

FIG. 19a is an enlarged view of a detail circled in FIG. 19;

FIG. 20 is a longitudinal section of a further embodiment of a hub for a rear bicycle wheel, according to the present invention;

FIG. 20a is an enlarged view of a detail circled in FIG. 20;

FIG. 21 is a longitudinal section of a further embodiment of a hub for a rear bicycle wheel, according to the present invention;

FIG. 21a is an enlarged view of a detail circled in FIG. 21;

FIG. 22 is a longitudinal section of a further embodiment of a hub for a rear bicycle wheel, according to the present invention;

FIG. 22a is an enlarged view of a detail circled in FIG. 22.

DETAILED DESCRIPTION OF THE PREFERRED EMBODIMENT(S)

With reference to FIGS. 1-10, reference numeral 10 globally indicates a first embodiment of a hub according to the present invention.

In particular, in the aforementioned figures a hub for a front bicycle wheel is shown.

The hub 10 is mounted on a fork 50 of a frame 52 of the bicycle.

Figure 3:
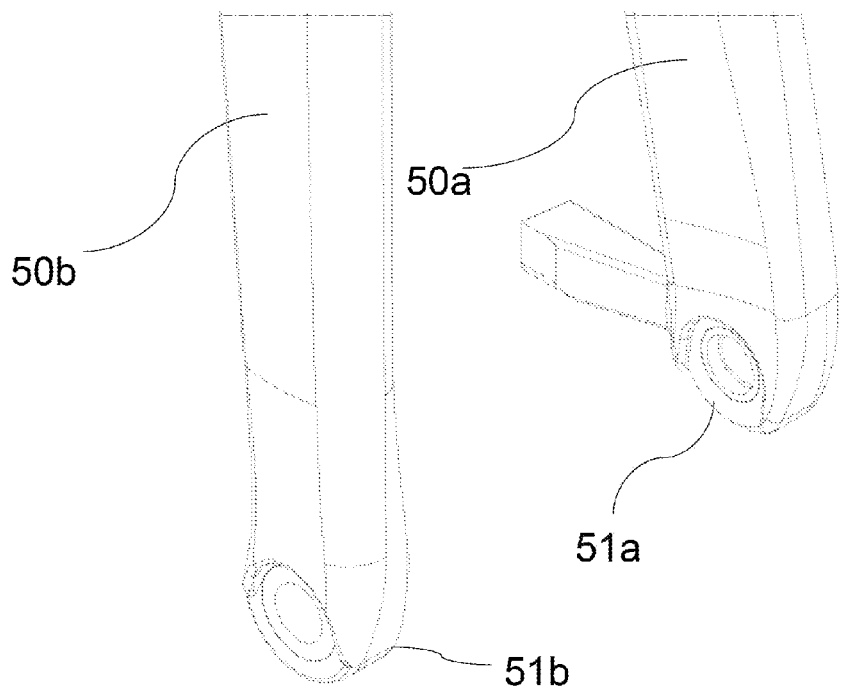
FIG. 3 is a perspective view of a portion of the fork of FIGS. 1 and 2.
Figure 4:
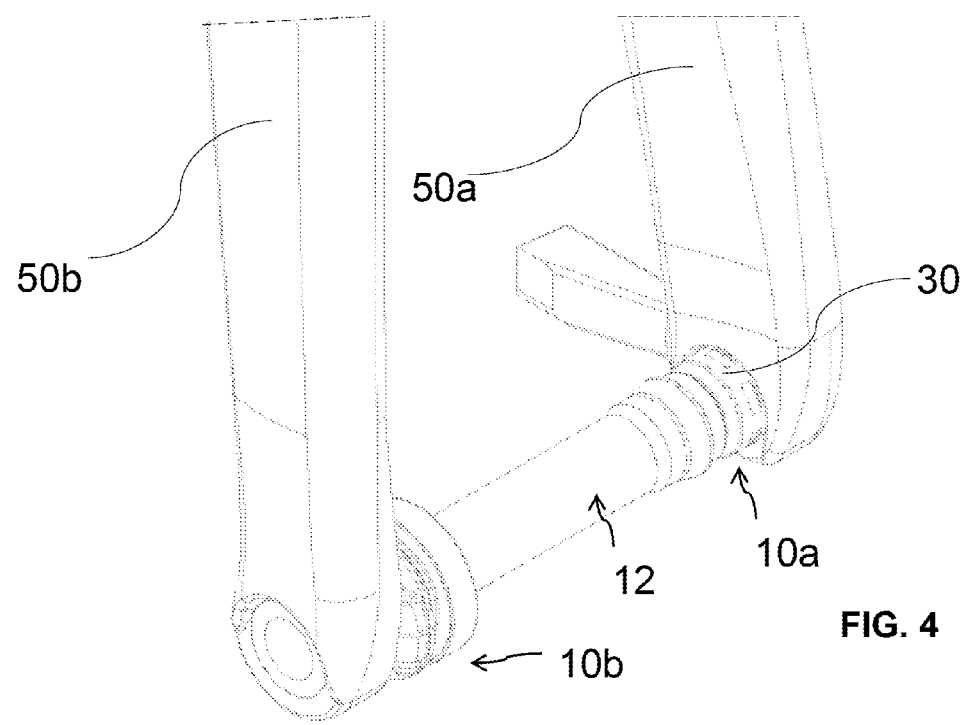
FIG. 4 is a perspective view of the portion of fork of FIG. 3 and of a portion of the hub of FIGS. 1 and 2.

In particular, the fork 50 comprises two opposite arms 50a, 50b at the respective free end portions of which seats 51a, 51b are provided for housing opposite end portions 10a, 10b of the hub 10 (FIGS. 3 and 4).

A caliper 62 of a disc brake is fixed on the frame 52 of the bicycle.

In particular, the caliper 62 is fixed in a conventional manner to one of the arms (in the example illustrated in the attached figures, the arm 50a) of the fork 50.

Inside the caliper 62 there are at least two opposite pads 63 (FIG. 5).

A brake disc 64 is mounted on the hub 10.

The brake disc 64 rotates inside the space defined between the opposite pads 63. By actuating the brake lever (not illustrated), the pads 63 are brought towards the brake disc 64, generating friction on the brake disc 64 and, consequently, braking the wheel.

With particular reference to FIGS. 4, 5 and 8-10, the hub 10 comprises a pin 12 extending along a longitudinal axis X and a body 14 rotatably mounted on the pin 12.

The pin 12 preferably has a through cavity 12c (FIG. 10).

The body 14 comprises a coupling portion 16 with the brake disc 64. Furthermore, the body 14 comprises, in a position adjacent to such a coupling portion 16 and at an axially more inner part with respect to it, a further coupling portion 17 with a plurality of spokes of the wheel (not shown). The coupling portions 16 and 17 are preferably portions of a single body. Alternatively, the coupling portions 16 and 17 can be defined in two distinct bodies.

On the pin 12, at axially opposite part with respect to the body 14, a flange is fitted comprising a portion 17a for coupling the remaining spokes of the wheel arranged at opposite part to the aforementioned plurality of spokes with reference to a middle plane of the rim of the wheel, such a plane being perpendicular to the rotation axis of the wheel. Such a flange 17a can, however, be integral part of the body 14. In this case, there would be a body 14 that extends coaxially to the pin 12 for a segment of greater length than that of the body 14 illustrated in FIGS. 8-10 and which would comprise the portion 16 for coupling with the brake disc 64, the coupling portion 17 and a coupling portion 17a with the aforementioned remaining spokes. A body 14 configured as above is illustrated for example in FIGS. 14-16 and 18-20.

At a free end portion 12a of the pin 12 a cap 20 is mounted. The cap 20 is associated with one of the arms of the fork 50 of the frame 52 of the bicycle, in particular, in the example illustrated in the attached figures, with the seat 51a of the arm 50a (FIGS. 5, 5b).

At the opposite free end portion 12b of the pin 12 a further cap 21 is associated (FIG. 10). The cap 21 is associated with the other of the arms of the fork 50 of the frame 52 of the bicycle, in particular, in the example illustrated in the attached figures, with the seat 51b of the arm 50b (FIG. 4).

A pair of rolling bearings 18, 19 (FIG. 10) is radially interposed between the pin 12 and the body 14 and allow the rotation of the body 14 with respect to the pin 12. The bearings 18, 19 are mounted in a position adjacent to the free end portions 12a, 12b of the pin 12, respectively.

With particular reference to the bearing 18, it has an inner ring 18a and an outer ring 18b.

The bearing 18 is in axial abutment with the body 14. In particular, the outer ring 18b of the bearing 18 is in axial abutment with the body 14.

The cap 20 is preferably screwed to the free end portion 12a of the pin 12. In particular, the free end portion 12a of the pin 12 comprises an external threading 13 and the cap 20 comprises an internal threading 26 matching such an external threading 13 (FIG. 5b).

The cap 21 is preferably snap-coupled or interference-coupled with the free end portion 12b of the pin 12 (FIG. 10).

The caps 20 and 21 comprise a respective longitudinal cavity 22, 23, that preferably is through (FIG. 10).

In accordance with the present invention, the hub 10 comprises a calibrated washer 30, having a substantially annular shape and predetermined longitudinal thickness.

The calibrated washer 30 is arranged in axial abutment with the pin 12 and the cap 20.

The calibrated washer 30 is housed in the longitudinal cavity 22 of the cap 20 and is in axial abutment with the cap 20 and with an end face 12d of the pin 12 (FIGS. 5b, 9).

In particular, the calibrated washer 30 is in axial abutment with an axially inner face 24a of an end wall 24 of the cap 20.

The calibrated washer 30 has a longitudinal thickness such that the brake disc 64 is perfectly centered between the pads 63 of the caliper 62, as illustrated in FIG. 5a.

If a calibrated washer 30 of lower longitudinal thickness than that of FIG. 5b were used, namely for example the calibrated washer 30 of FIG. 6b, the brake disc 64 would not be centered between the pads 63 of the caliper 62. In particular, the brake disc would be displaced towards the axially outermost pad 63 of the caliper 62, as illustrated in FIG. 6a.

Vice-versa, if a calibrated washer 30 of greater longitudinal thickness than that of FIG. 5b were used, namely for example the calibrated washer 30 of FIG. 7b, also in this case the brake disc 64 would not be centered between the pads 63 of the caliper 62. In particular, the brake disc would be displaced towards the axially innermost pad 63 of the caliper 62, as illustrated in FIG. 7a.

Thus depending on the specific assembly configuration of the hub 10, which can change as a function of the dimensional and mounting tolerances of the various components that compose the hub 10, a calibrated washer 30 is used the longitudinal thickness of which is suitable for ensuring the correct positioning of the brake disc 64 between the pads 63.

FIGS. 11-13 and 13a show a second embodiment of a hub 10 according to the present invention.

The components of the hub 10 of FIGS. 11-13 and 13a that are analogous or functionally equivalent to those of the hub 10 of FIGS. 1-10 are indicated with the same reference numeral and for their description we refer to what has been disclosed above.

The hub 10 of this second embodiment of the invention differs from the hub 10 described above substantially by the position of the calibrated washer 30.

Like in the first embodiment of the invention, the calibrated washer 30 is arranged in axial abutment with the pin 12 and the cap 20.

In this second embodiment, however, the calibrated washer 30 is in axial abutment with an end face 28 of the cap 20 and with a shoulder 12e formed on the pin 12 (FIGS. 12, 13a).

The shoulder 12e is formed at the free end portion 12a of the pin 12, in an axially inner position with respect to the threading 13.

The end face 28 has a substantially annular shape and is arranged at the axially opposite part with respect to the end wall 24 of the cap 20 (FIG. 13a).

The calibrated washer 30 is preferably fitted without interference on the free end portion 12a of the pin 12.

In the two embodiments described above, the brake disc 64 is integral with the body 14, which is mounted on the pin 12 in a predetermined axial position. The relative axial position between pin 12 and body 14 is fixed, apart from the dimensional tolerances. As the longitudinal thickness of the calibrated washer 30 changes, the axial position of the pin 12, and of the body 14 associated therewith, changes with respect to the cap 20. Since the cap 20 is integral with the frame 52 of the bicycle, and therefore with the pads 63 of the caliper 62 associated therewith, as the longitudinal thickness of the calibrated washer 30 changes, the axial position of the brake disc 64 with respect to the pads 63 changes.

FIGS. 14 and 14a show a third embodiment of a hub 10 according to the present invention.

The components of the hub 10 of FIGS. 14 and 14a analogous or functionally equivalent to those of the hub 10 of the previous figures are indicated with the same reference numeral and for their description we refer to what has been disclosed above.

The hub 10 of this third embodiment of the invention differs from the hub 10 of the second embodiment of the invention substantially by the position of the calibrated washer 30 and in that the body 14 extends coaxially to the pin 12 for a segment of greater length than that of the body 14 of the previous embodiments and comprises the portion 16 for coupling with the brake disc 64, the coupling portion 17 with a plurality of spokes of the wheel, and the coupling portion 17a with the remaining spokes of the wheel.

In this third embodiment the calibrated washer 30 is arranged in axial abutment with the pin 12 and the bearing 18.

In particular, the calibrated washer 30 is in axial abutment with the inner ring 18a of the bearing 18 and with a shoulder 12f formed on the pin 12 (FIGS. 14, 14a).

The shoulder 12f is provided between the free end portion 12a of the pin 12 and the bearing 18.

The outer ring 18b of the bearing 18 is in axial abutment with the body 14.

FIGS. 15 and 15a show a fourth embodiment of a hub 10 according to the present invention.

The components of the hub 10 of FIGS. 15 and 15a analogous or functionally equivalent to those of the hub 10 of the previous figures are indicated with the same reference numeral and for their description we refer to what has been disclosed above.

The hub 10 of this fourth embodiment of the invention differs from the hub 10 of the third embodiment of the invention substantially by the position of the calibrated washer 30.

In this fourth embodiment the calibrated washer 30 is axially interposed between the bearing 18 and the body 14.

In particular, the calibrated washer 30 is in axial abutment with the outer ring 18b of the bearing 18 and with a shoulder 14b formed on the body 14 (FIGS. 15, 15a).

The shoulder 14b is provided at an opposite part of the free end portion 12a of the pin 12 with respect to the bearing 18.

The inner ring 18a of the bearing 18 is in axial abutment with the shoulder 12f formed on the pin 12.

In the embodiments of FIGS. 14, 14a and 15, 15a, the brake disc 64 is integral with the body 14, which is mounted on the pin 12. The pin 12 is integral with the cap 20. The relative axial position between pin 12 and body 14 changes as the longitudinal thickness of the calibrated washer 30 changes. Since the cap 20 is integral with the frame 52 of the bicycle, and thus with the pads 63 of the caliper 62 associated therewith, as the longitudinal thickness of the calibrated washer 30 changes, the axial position of the brake disc 64 with respect to the pads 63 changes.

FIGS. 16-18 and 18a show a fifth embodiment of a hub 10 according to the present invention.

The components of the hub 10 of FIGS. 16-18 and 18a analogous or functionally equivalent to those of the hub 10 of the previous figures are indicated with the same reference numeral and for their description we refer to what has been disclosed above.

The hub 10 of this fifth embodiment of the invention differs from the hub 10 made according to the first embodiment of the invention substantially in that it is a hub for a rear bicycle wheel. Such a hub differs from that of the previous FIGS. 14 and 15 essentially due to the different conformation of the coupling portion 17a and in that it comprises a free-wheel body 40, per se conventional, provided with a coupling portion 116 with a plurality of sprockets (not illustrated), on which the bicycle chain engages.

The free-wheel body 40 is rotatably mounted on the pin 12.

A pair of rolling bearings 117, 118 (FIG. 18) is radially interposed between the pin 12 and the free-wheel body 40 and allow the rotation of the free-wheel body 40 with respect to the pin 12, integrally with the body 14. The bearings 117, 118 are mounted at opposite axial end portions of the free-wheel body 40. In particular, the bearing 118 is in a position adjacent to the free end portion 12b of the pin 12.

A spacer 127 is axially interposed between the outer ring of the bearing 117 and a shoulder formed on the free-wheel body 40.

The free-wheel body 40 is adjacent to one of the end portions of the body 14 (in the example illustrated in FIGS. 16-18, the end portion 10b), where the cap 21 is provided. At the other end portion 10a of the hub 10 the cap 20 is provided.

The cap 21 is preferably screwed to the free end portion 12b of the pin 12. In particular, the free end portion 12b of the pin 12 comprises an external threading (analogous to the external threading 13 described previously) and the cap 21 comprises an internal threading (analogous to the internal threading 26 described previously) matching such an external threading.

In a totally analogous manner to the first embodiment of the hub 10 of the invention, the hub 10 illustrated in FIGS. 16-18 and 18a comprises a calibrated washer 30, which is arranged in axial abutment with the cap 20 and the pin 12.

In particular, the calibrated washer 30 is housed in the longitudinal cavity 22 of the cap 20 and is in axial abutment with the cap 20 and with one of the opposite end faces 12d of the pin 12 (FIG. 18a).

Also in the embodiment of FIGS. 16-18 and 18a, since the brake disc 64 is integral with the body 14, which is mounted on the pin 12, and the pin 12 is integral with the cap 20, which is integral with the frame 52 of the bicycle, and therefore with the pads 63 of the caliper 62 associated therewith, the relative axial position between pin 12 and body 14 (and therefore the axial position of the brake disc 64 with respect to the pads 63) changes as the longitudinal thickness of the calibrated washer 30 changes.

As illustrated in FIGS. 16 and 17, the pin 12 of the hub 10 comprises, at at least one of the opposite free end portions thereof 12a and 12b (in the example illustrated in FIGS. 16 and 17, the axial end portion 12b), a polyhedron-shaped radially inner surface 11.

Preferably, the radially inner surface 11 comprises a plurality of substantially flat faces 11a, for example six, joined two-by-two at a respective rounded edge 11b (FIG. 17, where for the sake of simplicity only some of the reference numerals 11a, 11b have been indicated).

The pins 12 of the hubs 10 made according to the other embodiments described (previously with reference to FIGS. 1-15 and subsequently with reference to FIGS. 19 and 19a) can also have analogous polyhedron-shaped radially inner surfaces 11.

FIGS. 19 and 19a show a sixth embodiment of a hub 10 according to the present invention.

The components of the hub 10 of FIGS. 19 and 19a analogous or functionally equivalent to those of the hub 10 of the previous figures are indicated with the same reference numeral and for their description we refer to what has been disclosed above.

The hub 10 of this sixth embodiment of the invention is a hub for a rear bicycle wheel and differs from the hub 10 made according to the fifth embodiment of the invention substantially in that it comprises, as well as the calibrated washer 30, a further calibrated washer 30a dedicated to the adjustment of the axial position of the free-wheel body 40 with respect to the frame 52 of the bicycle.

In this sixth embodiment the calibrated washer 30a is axially interposed between the bearing 118 and the cap 21.

With reference to FIG. 19a, the bearing 118 has an inner ring 118a and an outer ring 118b.

In particular, the calibrated washer 30*a* is in axial abutment with an end face 128 of the cap 21 and with an inner ring 118*a* of the bearing 118.

Preferably, the calibrated washer 30*a* is fitted without interference on the free end portion 12*b* of the pin 12.

In the embodiment of FIGS. 19 and 19*a*, the adjustment of the position of the brake disc 64 with respect to the pads 63 is obtained through the calibrated washer 30*a* as described above with reference to the embodiment of FIGS. 16-18 and 18*a*. Furthermore, the sprocket assembly is integral with the free-wheel body 40, which is also mounted on the pin 12. The pin 12 is integral with the cap 21. The relative axial position between pin 12 and free-wheel body 40 changes as the longitudinal thickness of the calibrated washer 30*a* changes. Since the cap 21 is integral with the frame 52 of the bicycle, as the longitudinal thickness of the calibrated washer 30*a* changes, the axial position of the sprocket assembly mounted on the free-wheel body 40 with respect to the frame 52 changes.

The adjustment of the axial position of the body 14 (and therefore of the brake disc 64) is thus independent from the adjustment of the axial position of the free-wheel body 40 (and therefore of the sprocket assembly). In the specific example of FIG. 19, the first of the aforementioned adjustments is carried out in an analogous manner to what is described above with reference to the first embodiment of the present invention, but it can nevertheless be carried out, alternatively, in an analogous manner to the second, or third, or fourth embodiment described above.

FIGS. 20 and 20*a* show a seventh embodiment of a hub 10 according to the present invention.

The components of the hub 10 of FIGS. 20 and 20*a* analogous or functionally equivalent to those of the hub 10 of the previous figures are indicated with the same reference numeral and for their description we refer to what has been disclosed above.

The hub 10 of this seventh embodiment of the invention is also a hub for a rear bicycle wheel and differs from the hub 10 made according to the sixth embodiment of the invention substantially in that it is not intended for a bicycle wheel with disc brake.

Indeed, the body 14 of the hub 10 of this seventh embodiment comprises, at the opposite end portions, the portions 17 and 17*a* for coupling with the spokes of the bicycle but not also the portion 16 for coupling with the brake disc 64.

Consequently, in the hub 10 of FIGS. 20, 20*a* there is no calibrated washer 30.

It is instead provided a calibrated washer 30*a* axially interposed between the bearing 118 and the cap 21, in a totally analogous manner to what has been described above with reference to the sixth embodiment of the present invention.

There are alternative embodiments that differ from those illustrated in FIGS. 19 and 20 and described above only by the different positioning of the calibrated washer 30*a*.

For example, in a first alternative embodiment, illustrated in FIG. 21, the free-wheel body 40 is axially integral with the pin 12 and the calibrated washer 30*a* is housed in the longitudinal cavity 23 of the cap 21 and is in axial abutment with the cap 21 and with an end face of the pin 12 (in an analogous manner to what has been described above with reference to the calibrated washer 30 illustrated in FIGS. 5-10).

In particular, the calibrated washer 30 is in axial abutment with an axially inner face of an end wall of the cap 21.

In this embodiment, the sprocket assembly is integral with the free-wheel body 40, which is integral with the pin 12. The relative axial position between pin 12 and free-wheel body 40 changes as the longitudinal thickness of the calibrated washer 30*a* interposed between cap 21 and pin 12 changes. Since the cap 21 is integral with the frame 52 of the bicycle, as the longitudinal thickness of the calibrated washer 30*a* changes, the axial position of the sprocket assembly mounted on the free-wheel body 40 with respect to the frame 52 changes.

In another alternative embodiment, illustrated in FIG. 22, the calibrated washer 30*a* is axially interposed between a shoulder 12*g* created on the pin 12 and an inner ring 117*a* of the bearing 117.

Alternatively, the function carried out by the washer 30*a* can be carried out by the spacer 127 interposed between an outer ring 117*b* (FIG. 22*a*) of the bearing 117 and the free-wheel body 40. The spacer 127 is illustrated in FIGS. 18-25.

In the embodiment illustrated in FIG. 22 and/or in the cases in which the function carried out by the calibrated washer 30*a* is carried out by the spacer 127, the free-wheel body 40 is not axially integral with the pin 12 and the axial position of the free-wheel body 40 (and therefore the sprocket assembly mounted on it) with respect to the pin 12, which is integral with the cap 21 (and therefore with the frame 52) changes as the longitudinal thickness of the calibrated washer 30*a* and/or of the spacer 127 used changes.

In all of the embodiments described above the operator, by selecting the calibrated washer 30, 30*a* of desired longitudinal thickness among a plurality of calibrated washers of different thicknesses, is able to assemble the hub 10 and, when assembly is complete, precisely position the brake disc 64 with respect to the pads 63 of the caliper 62 associated with the frame 52 of the bicycle and/or the sprocket assembly with respect to the frame 52 of the bicycle.

Of course, those skilled in the art can bring numerous modifications and variants to the hub of the present invention, in order to satisfy specific and contingent requirements, all of which are in any case included in the scope of protection defined by the following claims.

What is claimed is:

1. A hub for a bicycle wheel, comprising:
 a pin extending along a longitudinal axis (X);
 a first body rotatably mounted on the pin and configured to take a predetermined axial position with respect to a frame of a bicycle;
 a first bearing radially interposed between the pin and the first body;
 a first cap associated with a first free end portion of the pin and configured to be associated with the frame of the bicycle;
 wherein the first bearing is in axial abutment with the first body, and the hub includes a first calibrated washer in axial abutment with the pin and one between the first cap and the first bearing or axially interposed between the first bearing and the first body, or in that said first calibrated washer is axially interposed between the first bearing and the first cap.

2. The hub according to claim 1, wherein said first calibrated washer, is housed in a longitudinal cavity of the first cap and is in axial abutment with the first cap and with one of opposite end faces of the pin.

3. The hub according to claim 2, wherein said first calibrated washer is in axial abutment with an axially inner face of an end wall of the first cap.

4. The hub according to claim 2, wherein said longitudinal cavity is a through cavity.

5. The hub according to claim 1, wherein said first body comprises a coupling portion with a brake disc.

6. The hub according to claim 5, wherein said first calibrated washer is in axial abutment with an end face of the first cap and with a first shoulder formed on the pin.

7. The hub according to claim 6, wherein said first calibrated washer is fitted without interference on the first free end portion of the pin.

8. The hub according to claim 1, wherein said first calibrated washer is in axial abutment with an inner ring of the first bearing and with a second shoulder formed on the pin, said second shoulder being provided between said first free end portion of the pin and said first bearing.

9. The hub according to claim 1, wherein said first calibrated washer is in axial abutment with an outer ring of the first bearing and with a third shoulder formed on the first body, said third shoulder being provided at an opposite part to said first free end portion of the pin with reference to said first bearing.

10. The hub according to claim 1, wherein said first body comprises a coupling portion with a plurality of sprockets.

11. The hub according to claim 10, wherein said first calibrated washer is in axial abutment with an end face of the first cap and with an inner ring of the first bearing.

12. The hub according to claim 11, wherein said first calibrated washer is fitted without interference on the first free end portion of the pin.

13. The hub according to claim 10, wherein said first calibrated washer is in axial abutment with an inner ring of the first bearing and with a fourth shoulder formed on the pin.

14. The hub according to claim 10, wherein said first calibrated washer is in axial abutment with an outer ring of the first bearing and with a fifth shoulder formed on the first body.

15. The hub according to claim 10, further comprising:
a second body rotatably mounted on the pin and comprising a coupling portion with a brake disc;
a second bearing radially interposed between the pin and the second body; and,
a second cap associated with a second free end portion of the pin and configured to be associated with the frame of the bicycle.

16. The hub according to claim 15, comprising a second calibrated washer in axial abutment with the pin and one between the second cap and the second bearing or axially interposed between the second bearing and the second body.

17. The hub according to claim 1, wherein the pin comprises, at said free end portion, a polyhedron-shaped radially inner surface.

18. The hub according to claim 17, wherein said radially inner surface comprises a plurality of substantially flat faces, joined two-by-two at a respective rounded edge.

19. A hub for a bicycle wheel, comprising:
a pin extending along a longitudinal axis (X);
a first body rotatably mounted on the pin and configured to take a predetermined axial position with respect to a frame of a bicycle;
a first bearing radially interposed between the pin and the first body;
a first cap associated with a first free end portion of the pin and configured to be associated with the frame of the bicycle;
wherein the first bearing is in axial abutment with the first body, and the hub includes a first calibrated washer positioned in at least one of: 1) axial abutment with the pin and one between the first cap and the first bearing; 2) axially interposed between the first bearing and the first body; and, 3) axially interposed between the first bearing and the first cap.

* * * * *